United States Patent [19]

Griffin

[11] 4,420,576

[45] Dec. 13, 1983

[54] PLASTICS BASED COMPOSITION CONTAINING A POLYESTER RESIN AND ALKALINE MODIFIED STARCH GRANULES

[75] Inventor: Gerald J. L. Griffin, London, England

[73] Assignee: Coloroll Limited, London, England

[21] Appl. No.: 287,913

[22] Filed: Jul. 29, 1981

[30] Foreign Application Priority Data

Aug. 6, 1980 [GB] United Kingdom ................ 8025601

[51] Int. Cl.$^3$ ............................ C08L 3/00; C08L 3/04
[52] U.S. Cl. ........................................ 524/47; 524/68; 525/54.2; 527/300
[58] Field of Search .............. 260/9, 17.4 R, 17.4 UC, 260/17.4 ST, 18 EP, 22 R, 22 CQ; 524/27, 47, 68; 525/54.2; 527/300, 311

[56] References Cited

U.S. PATENT DOCUMENTS

| | | | |
|---|---|---|---|
| 2,027,962 | 1/1936 | Currie | 260/17.4 |
| 2,623,025 | 12/1952 | Dearing | 260/17.4 |
| 3,276,899 | 10/1966 | Muhlberg et al. | 260/17.4 ST |
| 3,361,690 | 1/1968 | Gregory et al. | 260/17.4 R |
| 4,021,388 | 5/1977 | Griffin | 260/17.4 ST |
| 4,082,903 | 4/1978 | Chow | 260/17.4 R |

*Primary Examiner*—John Kight, III
*Assistant Examiner*—Nathan M. Nutter
*Attorney, Agent, or Firm*—Stevens, Davis, Miller & Mosher

[57] ABSTRACT

A plastics-based composition comprising a polyester resin and starch granules which, prior to mixing with the resin, are rendered reactive with the resin by a surface implant of alkali metal or alkaline earth metal ions.

2 Claims, No Drawings

PLASTICS BASED COMPOSITION CONTAINING A POLYESTER RESIN AND ALKALINE MODIFIED STARCH GRANULES

The present invention relates to compositions based on plastics and starch or other natural granules. The invention will hereinafter be described with reference to starch but, in principle, it may be applicable to any polysaccharides of granular form and low solubility.

The principal objective of the present invention is to provide a plastics based composition in which part of the synthetic polymer is replaced by starch granules, but the physical properties of the plastics are in substance preserved and even in some circumstances enhanced.

The use of natural starch granules as a filler in plastics based compositions has been proposed in our earlier U.K. Patent Specifications Nos. 1,485,833 and 1,487,050 but these were primarily concerned with thermoplastic polymers which are formed by physically intense processes such as extrusion or injection moulding. The present invention is primarily concerned with compositions based on the castable polymers such as epoxy and polyester resins which are not formed under pressure and are usually associated with fibrous reinforcements.

According to the present invention a plastics/starch composition is provided wherein the starch granules have the surface thereof modified to render them reactive with the polymer resin thereby enhancing the starch plastics bond. Thus alkali or alkaline earth metal ions can be implanted to render the starch reactive with a polyester resin thereby establishing a chemical bond.

Specifically we propose, prior to the mixing with the resin, a surface treatment of the starch granules which involves implanting a small residue of metal ions choosing the metals, the alkali or alkaline earth metals, whose oxides are alkaline in reaction in the presence of water. It can be observed that most commercial raw starches show a slightly acid pH when suspended in pure water and surface layers of the metal ions can readily be created on the surface of these starches by raising the pH of their suspension in water by simply adding solutions of alkalies whilst monitoring the pH of the slurries, finally recovering the alkali finished starch in any way convenient, for example by spray drying. In the case of alkaline earth metals the salts with weak acids may be convenient additive solutions. The active chemcal nature of the surface of the starch grains means that metallic ions can take up positions on these surfaces either by chemical reactions involving the ionization of H atoms in the surface—OH groups, or by simple physiosorption of metallic hydroxides, or by a combination of the processes. The benefits clearly seen in products based on polyester resins demonstrate a chemical interaction between the alkaline groups linked to the starch surfaces and acidic groups which are known to exist in the polyester resins and can be demonstrated by direct titration of these resins with alkali given a consistent and positive value for their acid numbers; typically in the range 10 to 30 mgs. KOH per gramme of resin.

Another surface modification in accordance with the invention comprises coating starch granules with a urea formaldehyde resin. When these coated granules are used as a filler in a urea or melamine formaldehyde thermosetting compression moulding power the development of linkages between the reactive surfaces and the resin matrix may be inferred from enhanced physical properties.

The following Examples illustrate the invention:

EXAMPLE 1

Potato starch filled polyester resin

Sodium hydroxide solution is the surface treating reagent, and potato starch is chosen as the filler because of its well known high ion exchanging ability on its surface. Polyester resin 'A' as supplied by Strand Glass Co. and two polyester resins supplied by Scott Bader Co., with different acid numbers were used. Because of its granule size the washing procedure of potato starch was relatively simple. The potato starch granules were easily decanted from the suspending solution and the clear liquor was also easily siphoned off. The general and simple procedure to "wash" the potato starch granules with alkali was as follows:

Potato starch of 14% moisture content as supplied commercially was suspended as a 10% slurry in distilled water by mechanical agitation, and the pH was adjusted to lie between 7.5 and 9.5 by the cautious addition of 0.1 molar sodium hydroxide solution. This suspension was allowed to settle and the supernatent liquid was removed by syphoning. The solids were re-suspended in a similar quantity of water, the pH again adjusted to the range 7.5 to 9.5 and the slurry was then dried by the use of a spray drying machine in which the atomization was performed by a compressed air atomizer system. The product was a white free-flowing powder of moisture content 4% or below. This material was subsequently oven dried at 80° C. to a final moisture content of less than 1%. Polyester samples were prepared by stirring blends of the appropriate resin syrup with the modified starch for a few minutes in a simple apparatus arranged so that the air pressure could be reduced briefly in order to free the composition from bubbles. When an acceptable blend had been prepared, the recommended catalyst concentration was then added (1% of MEK (Methyl Ethyl Ketone) peroxide solution of 50% concentration) and the stirring continued for a few minutes. Slabs were then cast in a simple mould using glass plates coated with a polyvinyl alcohol release layer.

From these cast slabs, after a uniform maturing period, test specimens were cut in the form of simple beams which were then submitted to standard (ASTM D790) mechanical test procedures. The results are tabulated below for samples containing in each instance 30 parts by weight of starch on 100 parts by weight of resin:

| Three point test of potato starch filled polyester resins | |
|---|---|
| Sample moulding | Cross-breaking strength (Megapascalls) |
| Resin (Strand Glass Co.; acid number: 24.30) | 96.9 |
| Potato$^a$ filled resin | 61.6 |
| Potato$^b$ filled resin | 71.4 |
| Resin; "Crystic 189LV" (Scott Bader Co.; acid number 21.05) | 106.0 |
| Potato$^a$ filled resin | 68.9 |
| Potato$^b$ filled resin | 76.6 |
| Potato$^c$ filled resin | 74.4 |
| Resin; "Crystic 272" (Scott Bader Co.; acid number 20.63) | 94.4 |
| Potato$^a$ filled resin | 70.0 |
| Potato$^b$ filled resin | 84.8 |

-continued

Three point test of potato starch filled polyester resins

| Sample moulding | Cross-breaking strength (Megapascalls) |
|---|---|
| Potato[c] filled resin | 84.7 |

[a]Potato starch granules washed several times with distilled water to a final pH of the slurry before drying about 5.5.
[b]Potato starch granules washed with sodium hydroxide solution (pH = 7.5).
[c]Potato starch granules washed with sodium hydroxide solution (pH = 9.5).

Several comments may be made on the basis of the above table, and the visual and Scanning Electron Microscope observations of the samples. First, it is noticed that the composites which have potato starch granules washed with alkali show a much higher cross-breaking strength than those using water washed starch. Thus, the alkali treatment enhances adhesion at the particles-resin interface. However, the alkali seems to reach a maximum effect at the low alkali concentration and then stabilizes its improvement.

Second, the transparence of the potato starch filled polyester resins and the consequent composite materials have a translucency fairly similar to the unfilled resins.

When fractured surfaces of these test pieces were submitted to examinations by scanning electron microscopy, it was very clear that the enhancement of adhesion between starch and resin effected by the optimum alkaline treatment had made a dramatic difference in the physics of fracture. Whereas the untreated potato starch filled specimens showed starch grains at the fracture surface substantially undamaged, those specimens made using alkaline treated starch showed starch grains which were almost all broken, in other words, the filler/matrix adhesion had reached the level required to transfer the fracture from the resin into the starch grains. These observations would clearly suggest that the breaking energy might be increased and this has in fact been supported experimentally by measurements of the Izod impact strength.

Improvement in Impact Strength

| | Izod Impact Strength in Joules/12.7 | Standard Deviation |
|---|---|---|
| Resin alone | 1.77 | 0.33 |
| Resin + 30% by weight treated potato starch | 2.10 | 0.15 |

EXAMPLE 2

Samples of cast slabs and test-beams were prepared, essentially as described in Example 1, but in this instance using a rice starch filler which had been derived from normal commercial material divided into two portions, one of which was simply washed with distilled water filtered through a screen of 38 micron apertures, and the solid recovered by spray drying. The second portion was submitted to an alkali washing procedure exactly as described in Example 1, and also recovered by spray drying from the slurry at pH 9.5. The test samples containing 30 parts by weight of starch at less than 1% final moisture content on 100 parts by weight of Strand Glass Company's resin 'A' again using the standard procedure of ASTM D790, gave results as detailed in the following table:

| Three point test of starch filled polyester resin 'A' (ASTM D790) | | | |
|---|---|---|---|
| Sample | Starch Conc. (per hundred parts of resin) | Cross-breaking strength (Megapascalls) | Flexural Modulus (Gigapascalls) |
| Unsaturated polyester resin alone | | 96.9 | 4.120 |
| Rice starch[a] filled resin | 30 | 77.0 | 4.425 |
| Rice starch[b] filled resin | 30 | 60.2 | 4.375 |

Rice starch[a] - alkali washed
Rice starch[b] - water washed

It should be emphasized that in both Examples the starch granules are preserved intact in the set resin. The modification is a surface modification and the inferred linkages are from the starch surface to the resin matrix.

With regard to proportion of modified starch present, up to 70% by weight can be incorporated. In order to maintain pourability however, of the order of 30% is a suitable figure, offering as it does a substantial replacement of polymer by starch and hence economic advantage, as well as the enhanced physical properties are set out above.

I claim:
1. A plastics-based composition comprising a polyester resin and starch granules which, prior to mixing with the resin, are rendered reactive with the resin by a surface implant of alkali metal or alkaline earth metal ions.
2. A composition according to claim 1 wherein the starch granules are washed with sodium hydroxide solutions and then mixed with a polyester resin.

* * * * *